(12) United States Patent
Perlman et al.

(10) Patent No.: US 6,881,000 B2
(45) Date of Patent: Apr. 19, 2005

(54) PHOSPHORESCENT MARKER FOR LABORATORY AUTOGRAPHY

(75) Inventors: Daniel Perlman, Arlington, MA (US); Mark Fins, Newton, MA (US)

(73) Assignee: Diversified Biotech, Inc., Boston, MA (US)

( * ) Notice: Subject to any disclaimer, the term of this patent is extended or adjusted under 35 U.S.C. 154(b) by 281 days.

(21) Appl. No.: 10/277,796

(22) Filed: Oct. 22, 2002

(65) Prior Publication Data

US 2004/0076746 A1 Apr. 22, 2004

(51) Int. Cl.$^7$ .............................. B43K 5/00; C09D 11/00
(52) U.S. Cl. .................... 401/198; 401/196; 106/31.13; 106/31.3
(58) Field of Search ................................ 401/196–206; 106/31.13, 31.33

(56) References Cited

U.S. PATENT DOCUMENTS

| | | | | |
|---|---|---|---|---|
| 3,779,780 A | * | 12/1973 | Dyson ..................... | 106/31.67 |
| 4,510,392 A | * | 4/1985 | Litt et al. ................. | 250/475.2 |
| 5,762,694 A | * | 6/1998 | Yokoi et al. .............. | 106/31.65 |
| 6,224,284 B1 | * | 5/2001 | Sukhna et al. ............. | 401/198 |

* cited by examiner

*Primary Examiner*—David J. Walczak
(74) *Attorney, Agent, or Firm*—Weingarten, Schurgin, Gagnebin & Lebovici LLP

(57) ABSTRACT

A laboratory autography marking pen capable of delivering a low viscosity phosphorescent marking ink that contains a homogeneous suspension of phosphor particles having an average particle size of between 10 and 40 microns, and whose afterglow half-life is less than 5 minutes. The marking pen further includes a high porosity fiber channel writing nib whose ink flow channels are of a sufficient size to allow the phosphor particles suspended in the ink to flow by capillary transport through these channels onto an ink receiving substrate material.

20 Claims, No Drawings

PHOSPHORESCENT MARKER FOR LABORATORY AUTOGRAPHY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to a phosphorescent ink marking device, and particularly to an improved marking pen that utilizes a combination of a low viscosity ink, large phosphor particles having a short half-life of phosphorescence (afterglow), and certain capillary fiber writing nibs that allow flow of this low viscosity phosphor suspension during the process of writing on a substrate surface. The invention also relates to a method of using this marking pen and ink suspension to make notations which, after photo-excitation, can be used to expose photographic film (or other photosensitive surface) employed in laboratory autography procedures such as chemiluminescence autography and autoradiography.

Phosphorescent particle-dispensing pens and crayons, as well as phosphor-containing tape for laboratory use have been described in the prior art. These so-called "glow-in-the dark" marking devices have been used for producing written notations and/or alignment markings on laboratory autograms. Such autograms are typically produced using a sheet of X-ray film or any other radiation-sensitive or photo-sensitive surface (including a two dimensional electronic matrix reporting surface) that has been placed into contact with a laboratory material (experimental substrate) containing either radioactive isotope "tracer" materials or alternatively, light-emitting chemicals, i.e., chemiluminescent agents. For example, flat experimental substrates such as dried electrophoretic gels and molecular transfer blots are commonly exposed to X-ray films to generate autoradiograms. Phosphorescent marking devices have been used previously for marking such experimental substrate surfaces so that the resulting autoradiographic or chemiluminescent film exposure (autogram) can be oriented and matched with the original experimental substrate. Furthermore, phosphorescent notations may provide certain useful information about the experiment and materials therein, e.g., the date of the experiment, certain notebook references, etc.

Litt et al. in U.S. Pat. No. 4,510,392 describe a process of forming phosphor markings of trace metal-doped zinc sulfide on a substrate carrying radioactive isotope-tagged material, charging the phosphor with light, exposing these markings and radioactive material on the substrate to X-ray film, and finally developing the film to show the markings on the substrate. Generally, the phosphor has a particle size distribution peak of between 10 and 15 microns. While the inventors state that the ink formulation is not particularly critical, the ink is described as containing from 5–20% by weight of the phosphor, and the exemplary inks are formulated to be sufficiently viscous and dense to keep the phosphor particles suspended in the ink. The dispensing devices preferred for applying this ink include a capillary metal or plastic tube and ball-point pens (such as those formerly sold by E. I. Du Pont de Nemours and Company, Wilmington, Del., the assignee of U.S. Pat. No. 4,510,392). Problems associated with viscous phosphor-containing inks are discussed below. Typewriter ribbons and hard graphite compositions have also been mentioned as means for applying phosphor particles to experimental substrates.

A crayon-like phosphorescent autographic marking device carrying the same or similar phosphor particles suspended in a wax-like matrix material is commercially available from Bel-Art Products, Inc. (Pequannock, N.J.), and is used in the laboratory for similar purposes.

Perlman in U.S. Pat. No. 5,051,596 describes a phosphorescent marking tape adapted for use in laboratory autography. The tape includes a coating containing phosphor grains similar to those found in the ink of Litt et al. Black ink writing or other conventional opaque markings applied to the upper surface of the phosphorescent tape prevents phosphorescence from being emitted from the phosphor grains located beneath the markings. Accordingly, when the marked photon-emitting phosphorescent surface is placed against an X-ray film, the tape will expose an image of itself on the film except at the location of the markings (film development thus reveals clear markings against a dark image of the tape).

In developing the use of the phosphorescent marking tape, Perlman in U.S. Pat. No. 5,051,596 describes limitations in the use of prior art phosphorescent ink markers. For example, phosphorescent ink markers such as those described by Litt et al. in U.S. Pat. No. 4,510,392 tend to produce phosphor-containing written notations of non-uniform thickness. As a result, the autographic film image from these notations is often of poor quality. Crayon-type deposits of phosphors have similar limitations. The possibility of developing improved phosphorescent inks and/or ink dispensing devices is not discussed in U.S. Pat. No. 5,051,596 but the patent provides a useful context for the present invention, and is therefore incorporated herein by reference in its entirety.

BRIEF SUMMARY OF THE INVENTION

The present invention concerns a marking pen and specialized writing nib that is able to deliver a uniform coating of short afterglow, large-sized phosphorescent particles (e.g., 10 microns and larger, copper-doped zinc sulfide crystals), suspended in a substantially low viscosity translucent liquid ink vehicle.

DETAILED DESCRIPTION OF THE INVENTION

Definitions. As used in this description and the accompanying claims, the following terms shall have the meanings indicated, unless the context otherwise requires:

The term "marking pen" as used herein, is a hollow writing instrument fashioned of metal or thermoplastic resin that includes a reservoir capable of storing either an organic solvent-based or a water-based liquid marking ink or paint. The marking pen also includes a writing nib that modulates the transfer of marking ink (and the width of a drawn line) onto a substrate material that receives the ink. Preferably, the marking pen also includes a control means such as a valve mechanism, e.g., a push-valve, located between the ink reservoir and the nib that can control or shut off the flow of ink to the nib.

The term "laboratory autography procedures" includes a procedure whereby a visual image is produced from a laboratory material generally arranged and displayed in two-dimensions (e.g., in a two-dimensional array of fractionated or purified materials, materials immobilized on a membrane, or materials in an electrophoretic gel, or in a biological material such as an thin section of animal or plant tissue), and in which either radioactive isotope substance(s) or chemiluminescent reagents are used to label or tag the laboratory material.

The term "low viscosity" (referring to the phosphorescent marking ink) is meant to include a range of intrinsic viscosities ranging between 10 and 200 cp measured at 25° C.

The term "average particle size" refers to the weight average diameter of phosphorescent phosphor particles. The 10 to 40 micron large sized particles are able to flow by capillary transport through only certain selected nibs.

The term "afterglow half-life" refers to the time interval required, following excitation of the dried phosphorescent marking ink with bright room light, for the initial phosphorescent light intensity to diminish to one-half of its original intensity as measured on the surface of the dried ink.

The term "high porosity nib" refers to marking pen nibs generally fabricated from synthetic fibers (e.g., polyethylene, polypropylene, polyester, polycarbonate, acrylic resin, or nylon) having a suitable thickness, and that are rather loosely bundled and bound together either by heat (self-bonding) or by resin (adhesive) bonding to create channels among the fibers. These channels allow ink and particulate material suspended in the ink to flow downward by capillary transport through the nib and out onto a sheet of paper, metal, or any other ink receiving substrate material.

The term "agitator element" that is preferably included in the reservoir portion of the marking pen refers to a compact and dense ball, rod or other object that when shaken in the marking ink, will help resuspend the phosphor particulate material that has settled out of the ink.

The term "pigment or dye" refers to chemically inert colored or white material added to the marker ink, that allows easy visualization of the ink being deposited while writing. Without adding pigment or dye, the phosphorescent material (given the amount deposited by the marker nib on a sheet of paper) is nearly invisible. If an excessive amount of pigment or dye is added to the phosphor-containing ink, the amount of detectable phosphorescence noticeably decreases.

The term "hexagonal Wurtzite crystalline form of zinc sulfide" and trace metal doping agents are detailed by Litt et al. in U.S. Pat. No. 4,510,392.

The viscosity levels (in centipoise units) discussed herein are Brookfield viscometer measurements at 25° C.

The marking pen of the instant invention comprises, in part, a specialized writing nib not previously used for ink products that is able to deliver a uniform coating of short afterglow, large-sized phosphorescent particles (e.g., 10 microns and larger, copper-doped zinc sulfide crystals). These particles are suspended in a substantially low viscosity translucent liquid ink vehicle. Occasional mixing is required to keep the particles in suspension.

The use of a low viscosity ink-like vehicle for the phosphor rather than thickened paint is critical to the present invention, but is counter-intuitive, because it allows fairly rapid settling (after several minutes or hours) of the heavy phosphor particles. However, the low viscosity of the ink vehicle (preferably 35–50 centipoise at 25° C.) is desirable because it allows the large phosphor particles to be carried via capillary transport through certain types of writing nibs such as those containing parallel synthetic fiber channels.

Typical porous felt writing nibs (e.g., wool felt-tipped marking pens) fail to allow capillary transport of the phosphor particles. Applicant tested such felt nibs and found that they became rapidly clogged when 10 micron phosphor-containing ink was placed in the ink reservoir behind the nib.

Applicant evaluated nibs used in totally unrelated products to determine if any performed satisfactorily with the low viscocity/large particle size ink product. In investigating the field of metallic luster paints such as those used in automotive coatings, it was found that paint markers carrying such metallic paints have been developed for touch-up repair painting for example. Such markers are able to dispense large sized suspended metallic pigment particles (larger than 10 microns) through a porous nib. Unlike traditional felt nibs, the touch-up paint nibs are fabricated with much larger flow channels. These nibs are typically composed of parallel fibers that create capillary channnels, allowing a reasonable rate of capillary flow even for paints carrying large pigment particles. Applicant tested conventional paints (having viscosities of several hundred centipoise) carrying suspended 25 micron copper-doped zinc sulfide phosphor particles. These paints did not readily flow through such nibs. It was suspected that a thinner vehicle such as a low viscosity clear lacquer or shellac (about 50 cp rather than 500 cp) carrying the same phosphor particles (temporarily suspended by shaking), might allow the phosphor to flow through the same nibs. Such capillary flow was confirmed using a conventional low viscosity lacquer vehicle. A paint marker with a replaceable fiber nib (provided by The Testor Corporation, Rockford, Ill.) proved to be a convenient dispensing instrument for the phosphor-containing lacquer. Resuspension of the phosphor particles in a low viscosity commercial lacquer is accomplished by shaking the paint marker. This resuspension is facilitated by including a steel ball or rod in the paint reservoir of the marker. The final viscosity of the phosphor-lacquer suspension can be easily decreased by adding solvent (or increased by adding microscopic fumed silica thickener, for example) and is adjusted to between 10 and 200 centipoise at 25° C. Preferably, the final viscosity is between 35 and 50 centipoise at 25° C. as measured using a Brookfield viscometer. A surprisingly uniform deposition of these phosphor particles was achieved on both smooth and rough paper substrate materials. This uniformity was evident after handwritten notations were made with the marking pen, then dried, exposed to visible light (to excite the phosphor) and finally exposed to X-ray film (e.g., using X-Omat AR-2 film, Eastman Kodak Company, Rochester, N.Y.) in total darkness. Visual inspection showed that the phosphor grain density was distributed evenly throughout the written notations registered on the film. By comparison, a thick paint vehicle such as that described in U.S. Pat. No. 4,510,392 carrying a similar phosphor tended to produce an uneven depositing of particles that, in turn, registered an uneven image on X-ray film.

Before and during use of the marker pen, it may be necessary to occasionally agitate the ink vehicle to maintain a uniform suspension and prevent settling of the phosphor particles in the liquid. As indicated above, this is assisted by including a metal ball, rod or cylinder in the paint reservoir of the marker. The pen contains an ink with a suspension of phosphor particles having an average particle size of between 10 microns and 40 microns, and preferably 10–25 microns. Such phosphor particles are preferably zinc sulfide-based crystals that may be doped with a variety of metals such as copper as described by Litt et al. in U.S. Pat. No. 4,510,392.

It was surprising that the paint nib was usable in the marker pen application. This nib was designed for use with high viscosity fluids, namely paint. As indicated above, the viscosity of the marking ink is significantly lower than that of paints. It would have been expected that the low viscosity ink would flow too quickly through the paint nib. In addition, the particle size of the insoluble components of the marking ink are quite large, preferably approximately 10–25 microns. Furthermore, it is surprising that the nib, when modified, was sufficiently durable to work in the marking pen. Nibs for automotive paints are generally quite large (approximately 3 mm×6 mm) and are flat, not pointed. In order to be suitable for the marking pen, the nib had to be shaped into a point, having a tip of approximately 0.4–3 mm in diameter (preferably 0.6–1.5 mm). (The diameters refer to the size of the nib where it is in contact with the writing surface.) Because of the large pore size in the nib, it was expected that the point might lose its structure (i.e., become mashed) and lose usefulness after little usage. Unexpectedly, the nib was found to be durable and maintain its structure and remain robust and useful for the entire contents of the pen.

As referenced above, the pen's porous nib that is preferably composed of parallel polymer fibers with open space between the fibers, differs markedly in structure from that found in conventional felt nibs or porous sintered polyethylene nibs. Many nibs have been tested for suitability of use in the present invention and many have been found to be unsuitable for a variety of reasons. For example, acrylic and polyester nibs manufactured by the Teibow Hanbai Company (Tokyo, JP) that are recommended for use with whiteboard marking inks (e.g., the CE448C and CE341S nibs) were tested and found unsuitable. Likewise, a number of conventional felt marker nibs used with either permanent or water-based inks were unsuitable. Applicant selected at least two nibs for use in the present invention by evaluating nibs known to be suitable for delivering metallic luster paints. For example, a series of polyester parallel fiber nibs (EB049F, EB149F, EB249F, EB349F, EB449F and EB549F) are manufactured by the Teibow Hanbai Company. Applicant learned that the fibers within these nibs are coated and/or adhered together with increasing amounts of resin binder. As the amount of resin is increased (EB049F having the least) the nib becomes more durable but the ink flow channels become smaller. While the phosphor particles suspended in inks used in the present invention flowed through the EB049 nib, its tip was somewhat susceptible to being deformed during writing. On the other hand, nibs EB349F, EB449F and EB549F proved durable but ink flow was slower, a decreasing amount of the phosphor passed through the nib, and eventually the nibs became clogged with the phosphor. Fortunately, nibs EB 149F and EB249F allowed ink and phosphor particle flow without the nib becoming clogged. Nib durability over time was somewhat better for EB249F than for EB149F, but phosphor flow was best in EB149F. The manufacturing methods and chemistry involved in forming appropriately sized channels with suitable capillary flow characteristics in these nibs are generally considered proprietary information. Generally it is known that such parallel fiber nibs provide a substantially greater percentage of open space, and a better path for ink flow than typical felt nibs used with conventional marking inks.

To be useful in the present invention, the fiber nib must have a substantially open channel structure with an effective pore size ranging from approximately 5 microns to 200 microns, depending upon the size of the phosphor particles selected for the ink. The nibs (e.g., those described above) that have been found useful in the present invention are those compatible with "capillary flow" inks and other liquid vehicles, e.g., paints, having viscosities and surface tensions often similar to that of water. Viscosity parameters may be varied modestly upward or downward but still must allow capillary flow of the large phosphor particles. High viscosity liquid vehicles, however, such as those used in general utility oil or water-based paints that resist sagging and that hold pigments in suspension for days or weeks at a time, are unsatisfactory. Large pore nibs useful in the present invention, e.g., those manufactured by the Teibow Hanbai Company (Tokyo, JP), Bacon Felt Company (Taunton, Mass.), and the Spartan Felt Company (Spartanburg, S.C.), have been fabricated from polyester, acetal, nylon, polypropylene, polyethylene or combinations thereof. In spite of the large ink flow channels in these fiber nibs, the ink flow may be regulated using suitable nib fiber coating materials, including a variety of resins used in nib manufacture that control the surface tension or adhesion between the ink and the nib fibers, thereby providing smooth and regulated ink flow. To additionally regulate ink flow and prevent any weeping or oozing of the low viscosity ink from the nib, an ink flow regulating valve is preferably placed between the reservoir that holds the marking ink, and the nib through which the ink passes to the substrate material, i.e., autography surface. Any one of several styles of ink or paint regulating valves that are commercially available may be selected. For example, the spring-loaded push-style valve is actuated, i.e., opened, by pressing down on the writing nib causing the nib to move inward against a spring-loaded valve. When the nib is released, the valve closes again.

These means of delivering large phosphor particles differ markedly from the prior art phosphorescent ink pens (e.g., capillary tube pens, ball point pens, crayons, etc.) in which a high viscosity paint or a solid wax vehicle was used to maintain suspension of the phosphor. As explained in U.S. Pat. No. 5,051,596, these prior art paint or ink pens tended to become clogged, delivered uneven amounts of fluid, and possessed poor writing properties.

Viewed more broadly, the field of presently available phosphorescent marking instruments fall into two groups that include hard markers such as crayons and chalks, and liquid, i.e., thick paint, markers described above. While the vehicles in these markers prevent settling of the phosphor particles, Applicant has found it difficult to achieve either a uniform deposition of phosphor particles or to obtain fine, i.e., thin, line writing of words and other notations using these markers.

Therefore, the present invention is designed to overcome significant shortcomings in the prior art phosphorescent inks as well as the ink dispensing devices of Litt et al. Also, as described in U.S. Pat. No. 5,051,596, the phosphorescent ink of Litt et al. creates uneven developed film images that are difficult to read. This problem is caused by the difficulty in writing with an ink or paint that must remain sufficiently thick and viscous to hold the large particle zinc sulfide phosphor particles in suspension. Another problem with the phosphorescent ink of Litt et al. is its long afterglow, e.g., 30 minutes. While this property was generally desirable for radioactive isotope exposures of film (autoradiographic exposures), the present invention requires inks having a relatively short afterglow. For example, in the present invention, it is preferable that approximately 75% of the afterglow (photon emission) is completed within 5 minutes following photo-excitation of the phosphor by visible room light. Expressed another way, it is preferred that the phosphor selected for use in the present invention have an initial half-life of phosphorescence of approximately 2–3 minutes so that after two half-lives (4–6 min.), most of afterglow has been exhausted. In this manner, longer autographic film exposures will not become over-exposed. One useful phosphor, a copper-doped zinc sulfide material produced by the United Mineral and Chemical Corporation (Lyndhurst, N.J.) is known as GB-U phosphor. Preferred phosphorescent inks contain between 5% and 35%, and preferably between 10% and 25% by weight of such zinc sulfide-based phosphors having an average particle size of between 10 and 25 microns. Empirically, it has been observed that such short afterglow phosphor-containing inks provide an acceptable degree of X-Omat AR (Kodak) x-ray film darkening when the film exposure is as short as 10 seconds or as long as 10 minutes or 10 days. These widely varying autographic exposure intervals are necessitated by the diverse autographic techniques presently employed, such as chemiluminescence and autoradiography. The former typically employs short-lived (minutes or hours) high level photon-emitting chemiluminescent reagents, while the latter typically employs long-lived (days, weeks, or months) radioactive isotopes that are slow to activate X-ray film.

Thus, in a first aspect, the invention features a marking pen adapted for use in laboratory autography procedures such as radioactive isotope autography procedures (autoradiography), and chemiluminescent autography procedures. The autography marking pen is capable of delivering a low viscosity (between 10 and 200 cp at 25° C.) phosphorescent marking ink that contains a homogeneous suspension of phosphor particles having an average particle size of between 10 and 40 microns, and whose afterglow half-life (time interval for the initial phosphorescent light intensity to decrease by one-half) is less than 5 minutes (and preferably less than 3 minutes), wherein said marking pen further comprises a high porosity fiber-type writing nib whose ink flow channels are of a sufficient size to allow such phosphor particles suspended in such ink to flow by capillary transport through the nib channels onto an ink receiving substrate material.

In one embodiment, the marking pen includes a reservoir for the phosphorescent marking ink, together with at least one agitator element in this reservoir that allows the phosphor particles to be resuspended in the marking ink upon manual shaking of the marking pen.

In another embodiment, the marking pen includes an ink flow valve located between the reservoir for the phosphorescent marking ink and the writing nib. The valve helps prevent low viscosity phosphorescent marking ink from leaking out of the nib when the marking pen is not being used.

In yet another embodiment, the phosphorescent ink in the marking pen further includes an amount of white or colored pigment or dye that is sufficient for the ink to be visible while writing. Without this visible colorant, the ink may not be visible when it is used, and the user will not be able to see the markings until photo-excitation occurs. A dye is generally preferable to a pigment because a pigment tends to be opaque while a dye is translucent, thereby allowing more light to enter and excite, as well as leave the phosphor particles as detectable phosphorescence.

In a related embodiment, the phosphorescent ink in the marking pen includes a colorant, which is a green or yellow pigment or dye. Since the color of the naturally emitted phosphorescent light is generally greenish-yellow, a green, a yellow or a yellow-green dye, for example, should absorb very little of the light output from the phosphorescent particles.

In another embodiment, the afterglow half-life of the phosphorescent ink, after the ink has dried on an ink receiving substrate material, is less than 3 minutes.

In still another embodiment, the phosphor particles in the ink have an average particle size of between 10 and 25 microns.

In another embodiment, the phosphor particles are zinc sulfide-based particles.

In a related embodiment, the zinc sulfide-based particles are copper-doped zinc sulfide-based particles. In a related embodiment, the phosphor particles are a hexagonal Wurtzite crystalline form of zinc sulfide doped with various trace metals.

In another embodiment, the phosphorescent marking ink includes a liquid vehicle selected from the group consisting of petroleum and water-based vehicles.

In yet another embodiment, the phosphorescent marking ink has a viscosity of between 35 and 50 centipoise at 25° C.

In still another embodiment, the phosphorescent marking ink contains between 5% and 30% by weight of said phosphor particles.

In another aspect of the invention, the marking pen includes a high porosity fiber-type writing nib that is fabricated from fibers selected from the group consisting of polyethylene fibers, polypropylene fibers, acrylic fibers, polyester fibers and nylon fibers. Typically, these fibers are partially fused or adhered together in a parallel pattern forming channels through which the ink can flow by capillary transport in a controlled fashion.

In another aspect, the invention describes a method that includes the steps of writing notations on a substrate material using the laboratory autography marking pen and phosphorescent marking ink described above, then exposing the annotated substrate material to visible or ultraviolet light to excite the phosphor particles in the marking ink, then placing the annotated substrate material into contact with X-ray film or other photo-detection surface for a period of time sufficient for the notations to be registered on a the photo-detection surface, and finally processing the photo-detection surface using a procedure suitable for visualizing the written notations.

The following example is intended to further illustrate, but not limit, the invention.

EXAMPLE

Autography Marking Pen

A series of marking pens having a push-valve style paint delivery opening that feeds ink to the nib, were each filled with approximately 10 ml of similar inks in which only the amount of copper-doped zinc sulfide phosphor was varied among the pens. The phosphor was "GB-U phosphor" obtained from United Mineral and Chemical Corporation, Lyndhurst, N.J.), and was added to samples of a conventional petroleum-based lacquer at concentrations of approximately 4%, 8% and 17% by weight. The lacquer was tinted green with a dye so that hand-written notations using the resulting ink (the lacquer+phosphor suspension) could be easily visualized during and after writing. A variety of acrylic fiber and polyester fiber-based nibs (parallel fiber structures having a rounded "bullet" shaped writing surface) were inserted into these pens, and each nib showed varying degrees of ink migration downward into the nib as the push valve was depressed to release ink. Nibs presumably having larger capillary channels showed a rapid migration of the green-dyed ink towards the tip of the nib. However, nibs with channels that were of insufficient size showed retarded migration of ink, as the phosphor particles presumably accumulated and blocked the flow of the ink at the proximal end of the nib (lying against the push valve in the pen). Notations were written on paper with those pens and nibs that had allowed successful ink flow (ink flow from one end of the nib to the other). The ink notations were air-dried, exposed to bright room light and then compared in the dark for phosphorescence intensity. Nibs that had shown rapid migration of ink (starting from the proximal end and moving to the distal "writing" end of the nib) produced written notations showing adequate phosphorescent intensity. These nibs were selected as the semi-final candidates (Teibow Hanbai Company; nibs EB049F, EB149F and EB249F). Final nib selection was based upon smoothness and minimum friction during writing on several different paper surfaces, nib durability and uniformity of ink lay-down. Of the above nibs, EB149 was rated best. Notations on paper made using the three inks containing increasing concentrations of GB-U phosphor were exposed to bright room light for one minute and then placed against X-Omat AR-2 X-ray film in a dark room as described above. When the phosphorescent notations were left against sheets of the X-ray film for different intervals of time (ranging from 30 seconds to 2 hours), and the film sheets were developed, it was evident that the highest concentration of GB-U phosphor (17% by weight) provided the greatest utility. That is, the autographic notations on films exposed for the shortest interval as well as the longest interval were easily legible. The notations made using inks with 4% and 8% levels of phosphor provided autographic notations on film considered somewhat too faint when short interval film exposures were developed and examined.

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The specific methods and compositions described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. For example, those skilled in the art will recognize that the invention may suitably be practiced using any of a variety of sources of phosphorescent particles that are stable, i.e., unreactive with a particular paint or ink and that have a suitable phosphorescent "afterglow" half-life.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group. For example, if there are alternatives A, B, and C, all of the following possibilities are included: A separately, B separately, C separately, A and B, A and C, B and C, and A and B and C. Thus, the embodiments expressly include any subset or subgroup of those alternatives, for example, any subset of the types of polymer treatment liquids. While each such subset or subgroup could be listed separately, for the sake of brevity, such a listing is replaced by the present description.

While certain embodiments and examples have been used to describe the present invention, many variations are possible and are within the spirit and scope of the invention. Such variations will be apparent to those skilled in the art upon inspection of the specification and claims herein.

Other embodiments are within the following claims.

What is claimed is:

1. A laboratory autography phosphorescent marking pen capable of delivering a low viscosity phosphorescent marking ink comprising a suspension of phosphor particles having an average particle size of between 10 and 40 microns, and whose afterglow half-life is less than 5 minutes, wherein said marking pen further comprises a high porosity nib whose ink flow channels are of a sufficient size to allow said phosphor particles suspended in said ink to flow by capillary transport through said channels onto an ink receiving substrate material.

2. The phosphorescent marking pen of claim 1 wherein the phosphorescent marking ink has a viscosity of between 10 and 200 centipoise at 25° C.

3. The phosphorescent marking pen of claim 2 wherein the phosphorescent marking ink has a viscosity of between 35 and 50 centipoise at 25° C.

4. The phosphorescent marking pen of claim 1 wherein said marking pen comprises a reservoir that contains said marking ink together with at least one agitator element that allows said phosphor particles to be resuspended in said marking ink upon manual shaking of said marking pen.

5. The phosphorescent marking pen of claim 1 wherein said ink further comprises an amount of colorant that is sufficient for said ink to be visible while writing, said colorant being a white or colored pigment or dye.

6. The phosphorescent marking pen of claim 5 wherein said colorant is one or more materials selected from the group consisting of green dye, yellow dye, green pigment and yellow pigment.

7. The phosphorescent marking pen of claim 1 wherein the afterglow half-life of said phosphorescent marking ink, after drying on said substrate material, is less than 3 minutes.

8. The phosphorescent marking pen of claim 1 wherein said phosphor particles having an average particle size of between 10 and 25 microns.

9. The phosphorescent marking pen of claim 1 wherein said phosphor particles are zinc sulfide-based particles.

10. The phosphorescent marking pen of claim 9 wherein said zinc sulfide-based particles are copper-doped zinc sulfide-based particles.

11. The phosphorescent marking pen of claim 1 wherein said phosphor particles are a hexagonal Wurtzite crystalline form of zinc sulfide doped with various trace metals.

12. The phosphorescent marking pen of claim 1 wherein said a high porosity fiber-type writing nib is fabricated from fibers selected from the group consisting of polyethylene fibers, polypropylene fibers, acrylic fibers, polyester fibers and nylon fibers.

13. The phosphorescent marking pen of claim 1, wherein said writing nib is formed into a point.

14. The phosphorescent marking pen of claim 13, wherein the point of said writing nib is approximately 0.4–3 mm in diameter.

15. The phosphorescent marking pen of claim 14, wherein said writing nib is 0.6–1.5 mm in diameter.

16. The phosphorescent marking pen of claim 1 wherein the liquid vehicle in said low viscosity phosphorescent marking ink is selected from the group consisting of petroleum and water-based vehicles.

17. The phosphorescent marking ink of claim 1 wherein said ink contains between 5% and 30% by weight of said phosphor particles.

18. The phosphorescent marking pen of claim 1 wherein said marking pen comprises a reservoir that contains said marking ink, and further comprises an ink flow valve positioned between said reservoir and said writing nib.

19. A method of using a laboratory autography marking pen comprising the steps of:

writing notations on a substrate material using the laboratory autography marking pen and phosphorescent marking ink of claim 1;

exposing the annotated substrate material to visible or ultraviolet light to excite the phosphor particles in said marking ink;

placing said annotated substrate material into contact with X-ray film or other photo-detection surface for a period of time sufficient for the notations to be registered on said photo-detection surface; and processing said photo-detection surface using a procedure suitable for visualizing said notations.

20. The method of claim 19, wherein said phosphorescent marking ink has a viscosity of between 10 and 200 centipoise at 25° C., said phosphor particles are zinc sulfide-based particles, and wherein said writing nib is formed into a point of approximately 0.4–3 mm in diameter.

* * * * *